(12) United States Patent
Wei et al.

(10) Patent No.: US 10,630,913 B2
(45) Date of Patent: Apr. 21, 2020

(54) LIDAR AND CAMERA DATA FUSION FOR AUTOMATED VEHICLE

(71) Applicant: Aptiv Technologies Limited, St. Michael (BB)

(72) Inventors: Junqing Wei, Bridgeville, PA (US); Junsung Kim, Pittsburgh, PA (US); Jong Ho Lee, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 193 days.

(21) Appl. No.: 15/499,076

(22) Filed: Apr. 27, 2017

(65) Prior Publication Data

US 2018/0316873 A1 Nov. 1, 2018

(51) Int. Cl.
| | | |
|---|---|---|
| *H04N 5/265* | (2006.01) | |
| *G01S 17/02* | (2020.01) | |
| *G01S 17/42* | (2006.01) | |
| *G01S 17/93* | (2020.01) | |
| *B60R 11/04* | (2006.01) | |
| *G08G 1/16* | (2006.01) | |
| *G05D 1/02* | (2020.01) | |

(52) U.S. Cl.
CPC ............ *H04N 5/265* (2013.01); *B60R 11/04* (2013.01); *G01S 17/023* (2013.01); *G01S 17/42* (2013.01); *G01S 17/936* (2013.01); *G05D 1/0236* (2013.01); *G08G 1/166* (2013.01); *G08G 1/167* (2013.01); *B60R 2300/102* (2013.01); *B60R 2300/105* (2013.01); *B60R 2300/301* (2013.01); *B60R 2300/8093* (2013.01)

(58) Field of Classification Search
CPC ........ H04N 5/265; G08G 1/166; G08G 1/167; G01S 17/023; G01S 17/42; G01S 17/936; G05D 1/0236; B60R 11/04; B60R 2300/301; B60R 2300/105; B60R 2300/102; B60R 2300/8093
See application file for complete search history.

(56) References Cited

U.S. PATENT DOCUMENTS

| | | |
|---|---|---|
| 9,261,881 B1 | 2/2016 | Ferguson et al. |
| 9,383,753 B1 | 7/2016 | Templeton et al. |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

(Continued)

*Primary Examiner* — Twyler L Haskins
*Assistant Examiner* — Angel L Garces-Rivera
(74) *Attorney, Agent, or Firm* — Fish & Richardson P.C.

(57) ABSTRACT

A data-fusion system that fuses lidar-data and camera-data for an automated vehicle includes a camera, a lidar, and a controller. The camera renders an image of an object proximate to a host-vehicle. The lidar detects a distance and a direction to the object based on a reflected-signal of light reflected by the object. The controller is in communication with the camera and the lidar. The controller is configured to determine a reflectivity-characteristic of the object based on the image and the reflected-signal, and adjust a detection-characteristic of the lidar when the reflectivity-characteristic of the object makes it difficult for the lidar to detect the distance and the direction to the object.

24 Claims, 2 Drawing Sheets

(56) References Cited

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
European Extended Search Report in European Application No. 18165670.3, dated Oct. 4, 2018, 7 pages.

LIDAR AND CAMERA DATA FUSION FOR AUTOMATED VEHICLE

TECHNICAL FIELD OF INVENTION

This disclosure generally relates to a data-fusion system that fuses lidar-data and camera-data, and more particularly relates to a system that determines a reflectivity-characteristic of an object based on an image from a camera, and adjust a detection-characteristic of a lidar when the reflectivity-characteristic of the object is such that a reflection-fraction of light-energy from the lidar that impinged on the object and is reflected by the object towards the lidar is less than a fraction-threshold.

BACKGROUND OF INVENTION

It is known Lidar has difficulty detecting black/non-reflective and chrome objects because a signal-strength of a reflected-signal is weak or non-existent.

SUMMARY OF THE INVENTION

In accordance with one embodiment, a data-fusion system that fuses lidar-data and camera-data for an automated vehicle is provided. The system includes a camera, a lidar, and a controller. The camera renders an image of an object proximate to a host-vehicle. The lidar detects a distance and a direction to the object based on a reflected-signal of light reflected by the object. The controller is in communication with the camera and the lidar. The controller is configured to determine a reflectivity-characteristic of the object based on the image and the reflected-signal, and adjust a detection-characteristic of the lidar when the reflectivity-characteristic of the object makes it difficult for the lidar to detect the distance and the direction to the object.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
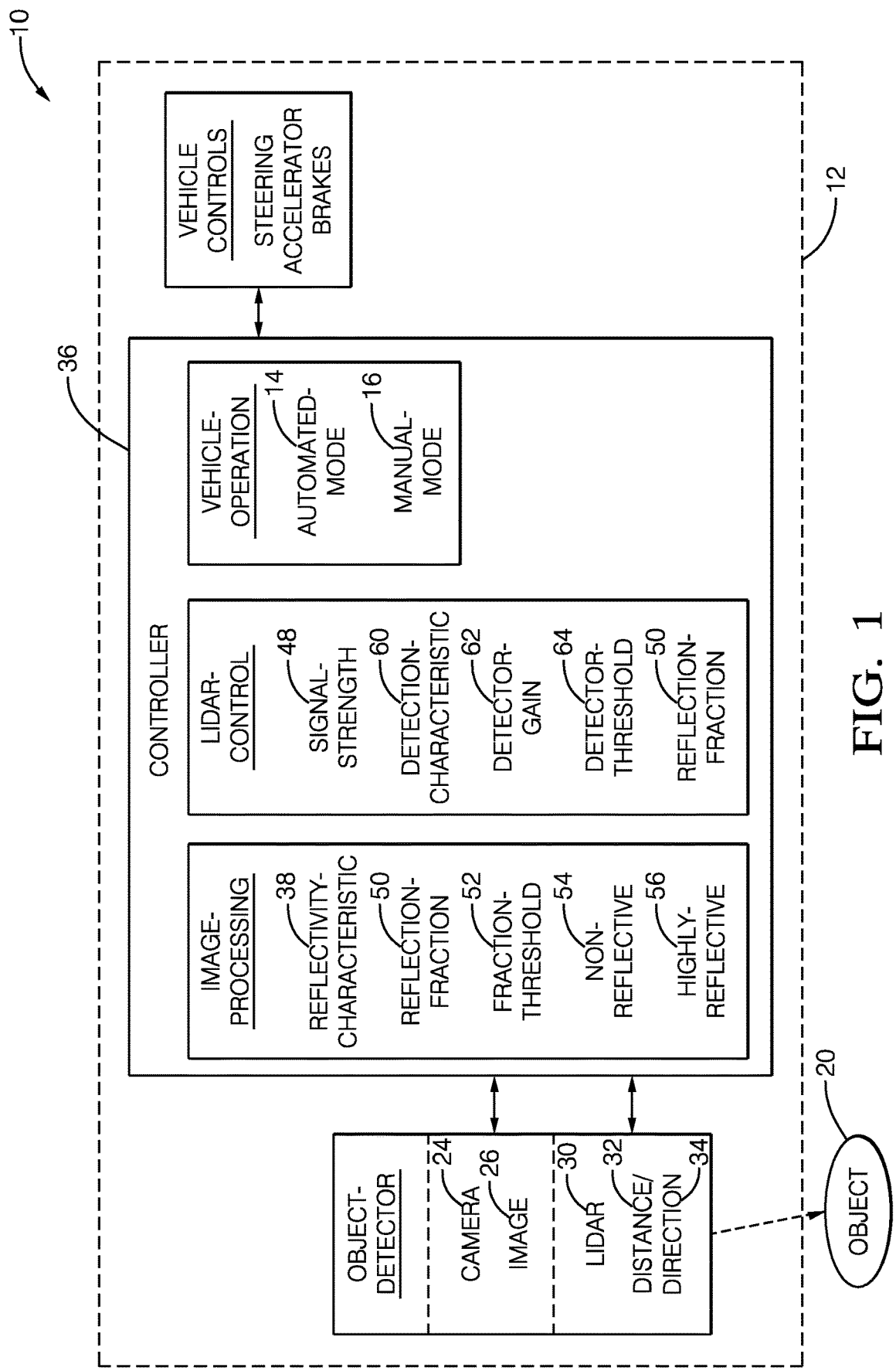
FIG. 1 is a diagram of a data-fusion system in accordance with one embodiment.

FIG. 1 illustrates a non-limiting example of a data-fusion system 10, hereafter referred to as the system 10. As will be explained in more detail below, one aspect of the system 10 is that lidar-data and camera-data are fused or synergistically combined for use by an automated vehicle, e.g. a host-vehicle 12. As used herein, the term automated vehicle may apply to instances when the host-vehicle 12 is being operated in an automated-mode 14, i.e. a fully autonomous mode, where a human-operator of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object 20 such as an other-vehicle 22 (FIG. 2), and/or to follow the other-vehicle 22 at some safe distance.

The system 10 includes a camera 24 that renders an image 26 of the object 20 (e.g. the other-vehicle 22) proximate to, i.e. within two-hundred meters (200 m) and typically within a line-of-sight of, the host-vehicle 12. The camera 24 may be a single imaging device that provides the image 26 from a single perspective, or the camera 24 may include multiple imaging devices mounted at different locations about the host-vehicle 12, where the output of the multiple imaging devices are combined to form the image 26, for example a three-hundred-sixty degree (360°) image. Various types of cameras suitable for use on the host-vehicle 12 are commercially available, as will be recognized by those in the art.

The system 10 also includes a lidar 30 that detects a distance 32 and a direction 34 to the object 20. Like the camera 24, various examples of the lidar 30 suitable for use on the host-vehicle 12 are commercially available. As suggested in FIG. 1, the camera 24 and the lidar 30 may be part of a unified assembly called an object-detector; however this is not a requirement. Co-locating the camera 24 and the lidar 30 may be advantageous to more easily align the respective fields-of-view of the camera 24 and the lidar 30, but various techniques to electrically align the outputs from these respective devices have been suggested.

The system 10 also includes a controller 36 in communication with the camera 24 and the lidar 30. The controller 36 may include a processor (not specifically shown) such as a microprocessor or other control circuitry such as analog and/or digital control circuitry including an application specific integrated circuit (ASIC) for processing data as should be evident to those in the art. The controller 36 may include memory (not specifically shown), including non-volatile memory, such as electrically erasable programmable read-only memory (EEPROM) for storing one or more routines, thresholds, and captured data. As will be explained in more detail below, the one or more routines may be executed by the processor to perform steps for determining when the object 20 is difficult for the lidar 30 to detect based on the image 26 received by the controller 36 from the camera 24.

It has been observed that lidars sometimes have problems detecting an object that either strongly absorbs the infrared laser beams emitted by the lidar, or strongly reflects the infrared laser beams in directions other than towards the lidar. For example, black painted surfaces tend to strongly absorb most of the light from the laser beams, at least more so than other colors. As another example, chrome-bumpers on vehicles tend to strongly reflect most of the light from the laser beams in directions other than towards the lidar, e.g. toward the sky or towards the ground. In either case, the reflected-signal, i.e. the portion of the laser-beam emitted by the lidar that is reflected back toward the lidar, can be so weak that it is difficult for the lidar to detect the reflected-signal.

Figure 2:
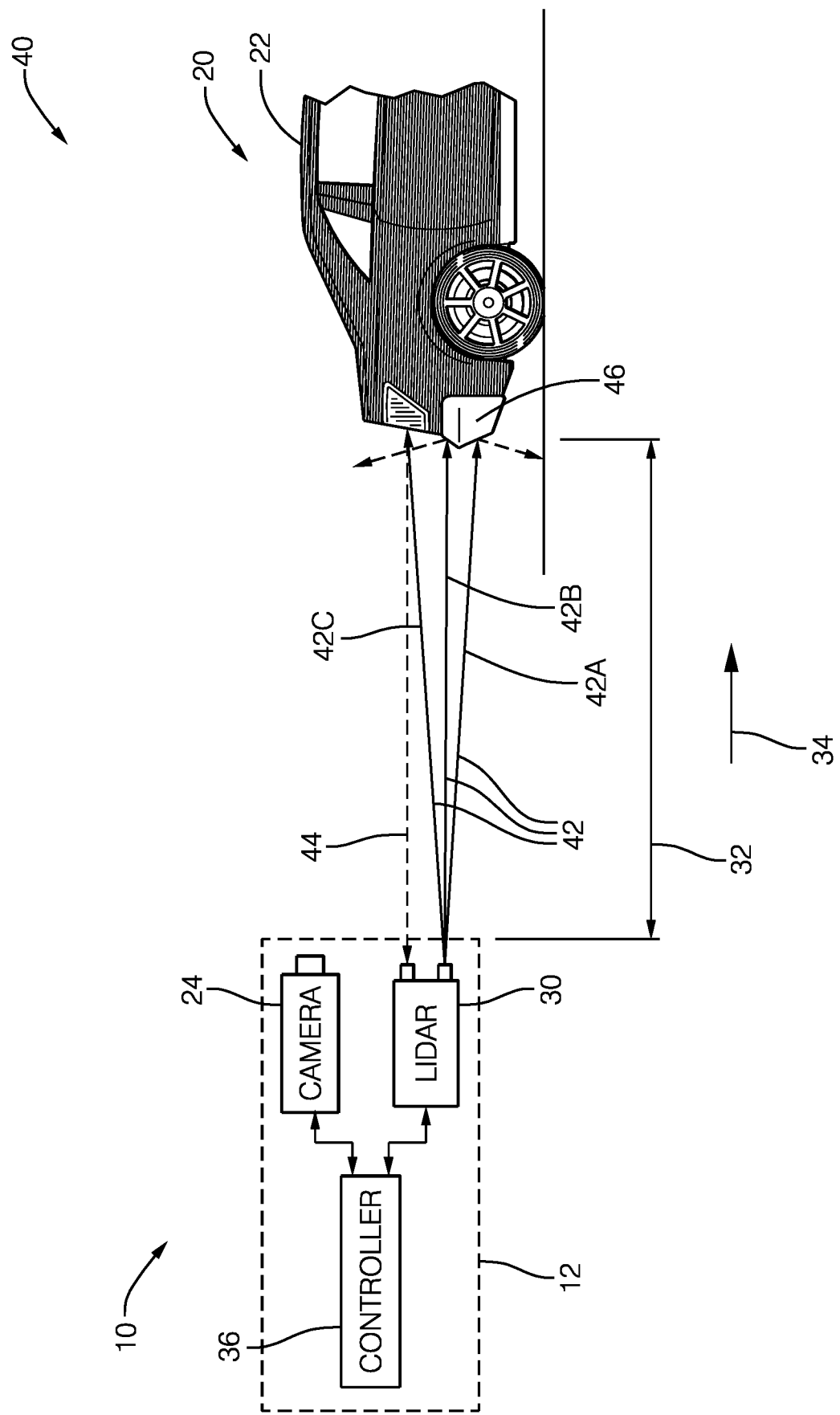
FIG. 2 is a side-view of a scenario encountered by the system of FIG. 1 in accordance with one embodiment.

FIG. 2 illustrates a non-limiting example of a scenario 40 where the other-vehicle 22 is located in front of or forward of the host-vehicle 12. As will be recognized by those in the art, the lidar 30 emits a plurality of laser-beams 42, and some of the laser-beams 42 may illuminate or impinge on the object 20 and be reflected by the object 20 back toward the lidar 30 to produce or provide one or more instances of a reflected-signal 44. The other-vehicle 22 may be equipped with a chrome-bumper 46 that acts like a mirror and reflects almost all of the laser-beam 42A and the laser-beam 42B in directions other than towards the lidar 30, so at least for the laser-beam 42A and the laser-beam 42B the object 20, or more specifically the chrome-bumper 46 goes undetected by the lidar 30. All or part of the other-vehicle 22 may be painted black or may have some other surface treatment that highly-absorbent to light, i.e. characterized as non-reflective. For example, the laser-beam 42C may impinge or illuminate a spot on the other-vehicle 22 that is highly-absorbent to light or non-reflective.

As a first step to overcome this problem, the system 10, or more specifically the controller 36, is configured or programmed to determine a reflectivity-characteristic 38 of the object 20, or the reflectivity-characteristic 38 of a portion of the object 20, based on the image 26 from the camera 24 and/or the reflected-signal 44 detected by the lidar 30. There are numerous ways the reflectivity-characteristic 38 can be determined, some of which will now be described by way of non-limiting examples.

One way the reflectivity-characteristic 38 of the object 20 can be determined or estimated is to compare a signal-strength 48 of the reflected-signal 44 to the size of the object 20 in the image 26. In FIG. 2, the reflected-signal 44 is illustrated as originating from a single instance of the laser-beams 42 only to simplify the illustration. Those in the art will recognize that there will likely be multiple instances of the reflected-signal 44 originating from many more than the three instances of the laser-beams 42 impinging on the object 20 as illustrated. The signal-strength 48 may be determined based on how many instances of the reflected-signal 44 are detected and comparing that value to an estimate of how many instances of the laser-beams 42 are expected or estimated to have impinged on the object 20 based on the size of the object 20 in the image 26. That is, if the object 20 is relatively large and/or close, it is expected that more instances of the laser-beams 42 will impinge on the object 20 than would be the case if the same object 20 was farther away, and/or the object 20 was relatively small.

Alternatively, the signal-strength 48 of the reflected-signal 44 may be determined based on the intensity or brightness of the reflected-signal 44 as detected by the lidar 30. That the reflected-signal 44 may have been reflected by the object 20 may be determined by establishing a bounding-box around the object 20 in the image 26, and then relying on the aforementioned alignment between the camera 24 and the lidar 30 to determine which of the laser-beams 42 may have impinged on the object 20. That is, it can be determined if the reflected-signal 44 likely originated from within or outside of the bounding-box, and if from within the bounding-box it can be presumed that that the reflected-signal 44 was reflected by the object 20. From that intensity measurement the signal-strength 48 is determined, and from the signal-strength 48 and the distance 32 the reflectivity-characteristic of the object 20 or a portion of the object 20 can be determined.

As suggested above, certain types or classifications of the reflectivity-characteristic 38 of the object 20 makes it difficult for the lidar 30 to detect the distance 32 and the direction 34 to the object 20. One way to characterize the object 20 or a surface of the object 20 that makes it difficult for the lidar 30 to detect the reflected-signal 44 is when a reflection-fraction 50 of light-energy (e.g. the laser-beams 42) from the lidar 30 that impinged on the object 20 and is reflected by the object 20 towards the lidar 30 is less than a fraction-threshold 52.

By way of example and not limitation, the reflection-fraction 50 may be determined based on the signal-strength 48 of the reflected-signal 44 detected by the lidar 30. That is, if some value for the distance 32 is presumed so signal loss due to dispersion/divergence of the laser-beams 42 and the reflected-signal 44 can be considered, the signal-strength 48 (i.e. the intensity) of the reflected-signal 44 may be used to determine the reflection-fraction 50. Alternatively, the camera 24 may be configured or selected to be able to detect the infrared-light of the laser-beams 42, so the signal-strength of the reflected-signal 44 maybe determined from the image 26. As another alternative, the image 26 may be analyzed using image-processing to determine the ambient-light intensity about the object 20, and then examine the brightness of the object 20 in the image 26.

The value of the fraction-threshold 52 may be determined by empirical testing. However it is contemplated that computer modeling may be useful to determine when the fraction-threshold 52 should be adjusted for various environmental conditions such during the precipitation of rain or snow, or the presence of fog. As some further non-limiting example, the reflection-fraction 50 may be less than the fraction-threshold 52 when a surface of the object 20 is characterized as non-reflective 54 such as when a color of the object 20 is black, i.e. painted black or covered with a black (e.g. flat-black) sticker, or other-wise treated so that a surface of the object 20 generally does not reflect light. FIG. 2 shows the reflected-signal 44 as originating from the laser-beam 42C impinging on a painted surface of the other-vehicle 22. If this painted surface is black or flat-black, the reflected-signal 44 may be very weak because the reflection-fraction 50 may be less than the fraction-threshold 52.

Another way to characterize the object 20 or a surface of the object 20 that makes it difficult for the lidar 30 to detect the reflected-signal 44 is when a reflection-fraction 50 seems to be less than a fraction-threshold 52 because the object 20 or a surface of the object 20 is characterized as highly-reflective 56, i.e. mirror-like. This would seem to be the polar-opposite of when the object is characterized as non-reflective 54. However, as suggested in FIG. 2, if the laser-beam 42A and the laser-beam 42B impinge on the chrome-bumper 46, the reflections of those laser-beams may be almost entirely directed away from the lidar 30 as shown. So, even though the object 20 is characterized as highly-reflective 56, the reflection-fraction 50 may be less than the fraction-threshold 52 when a surface of the object 20 is chrome.

Once the reflectivity-characteristic 38 of the object 20 is determined, it may be advantageous to adjust a detection-characteristic 60 (e.g. a detector-gain 62 and/or a detection-threshold 64) of the lidar 30 when the reflectivity-characteristic 38 of the object 20 is such that a reflection-fraction 50 of light-energy from the lidar 30 that impinged on the object 20 and is reflected by the object 20 towards the lidar 30 is less than a fraction-threshold. Baseline calibration values of the detector-gain 62 and the detection-threshold 64 may be established through empirical testing to find a balance between noise rejection and sensitivity. That is, if the detector-gain 62 of the lidar 30 is too great, the ability of the lidar 30 to detect the distance 32 and the direction 34 to the object 20 may be impaired because of excessive false detections. Similarly, if the detection-threshold 64 is set too low, similar problems with false detection may occur. In contrast, if detector-gain 62 is too low, and/or the detection-threshold 64 is too great, the lidar 30 may not detect the reflected-signal 44 and/or may fail to determine that the reflected-signal 44 originated from the object 20.

However, given that the presence and approximate location of the object 20 can be determined from the image 26, detector-gain 62 may be increased and/or the detection-threshold 64 may be decreased when the reflection-fraction 50 is less than the fraction-threshold 52. That is, because the presence of the object 20 is known from the image, the detection-characteristics 60 of the lidar 30 may be adjusted to better detect the distance 32 and/or the direction 34 to the object 20 even though there is a recognized increased risk of noise and or false detection. It is contemplated that the changes to the detection-characteristics 60 may be limited to a portion of the field-of-view of the lidar 30 that corresponds to or is aligned with the aforementioned bounding-box that is placed around the object 20 in the image 26.

Accordingly, a data-fusion system (the system 10), a controller 36 for the system 10, and a method of operating the system 10 is provided. The system 10 provides a means for the detection-characteristics 60 of the lidar 30 to be dynamically adjusted to optimize the detection-characteristics 60 based on the reflectivity-characteristic of the object 20.

While this invention has been described in terms of the preferred embodiments thereof, it is not intended to be so limited, but rather only to the extent set forth in the claims that follow.

We claim:

1. A system comprising:
   a camera of a host-vehicle that renders an image of an object proximate to the host-vehicle;
   a light detection and ranging (lidar) sensor of the host-vehicle that transmits light-energy that impinges the object;
   a controller in communication with the camera and the lidar, said controller configured to:
   determine, using the image, a reflection-fraction of the light-energy that impinged on the object and is reflected by the object towards the lidar;
   compare the reflection-fraction with a fraction-threshold; and
   in accordance with a result of the comparing, adjust a detection-characteristic of the lidar.

2. The system in accordance with claim 1, wherein the reflection-fraction is also determined based on a signal-strength of the reflected light-energy detected by the lidar.

3. The system in accordance with claim 1, wherein the reflection-fraction is less than the fraction-threshold when a surface of the object is characterized as non-reflective.

4. The system in accordance with claim 1, wherein the reflection-fraction is less than the fraction-threshold when a color of the object is black.

5. The system in accordance with claim 1, wherein the reflection-fraction is less than the fraction-threshold when a surface of the object is characterized as highly-reflective.

6. The system in accordance with claim 1, wherein the reflection-fraction is less than the fraction-threshold when a surface of the object is chrome.

7. The system in accordance with claim 1, wherein the detection-characteristic includes a detector-gain of the lidar, and the detector-gain is increased when the reflection-fraction is less than the fraction-threshold.

8. The system in accordance with claim 1, wherein the detection-characteristic includes a detection-threshold of the lidar, and the detection-threshold is decreased when the reflection-fraction is less than the fraction-threshold.

9. The system in accordance with claim 1, wherein the reflection-fraction is determined using a strength of the reflected light-energy detected in the image.

10. The system in accordance with claim 1, wherein the fraction threshold is adjusted according to environmental conditions.

11. The system in accordance with claim 1, wherein adjusting the detection-characteristic of the lidar includes increasing a detector-gain or a detector-threshold of the lidar to better detect a distance or direction to the object.

12. The system in accordance with claim 1, wherein adjusting the detection-characteristic of the lidar includes adjusting a portion of a field-of-view of the lidar that corresponds to a bounding-box that is placed around the object by an object-detector.

13. A method comprising:
   rendering, using a camera of a host-vehicle, an image of an object proximate to the host-vehicle;
   transmitting, by a light detection and ranging (lidar) sensor of the host-vehicle, light-energy that impinges the object;
   determining, by a controller of the host-vehicle, a reflection-fraction of the light-energy that impinged on the object and is reflected by the object towards the lidar, the reflection-fraction determined using the image;
   comparing, by the controller, the reflection-fraction with a fraction-threshold; and
   in accordance with the reflection-fraction being less than the fraction-threshold,
   adjusting a detection-characteristic of the lidar.

14. The method in accordance with claim 13, wherein the reflection-fraction is also determined based on a signal-strength of the reflected light-energy.

15. The method in accordance with claim 13, wherein the reflection-fraction is less than the fraction-threshold when a surface of the object is characterized as non-reflective.

16. The method in accordance with claim 13, wherein the reflection-fraction is less than the fraction-threshold when a color of the object is black.

17. The method in accordance with claim 13, wherein the reflection-fraction is less than the fraction-threshold when a surface of the object is characterized as highly-reflective.

18. The method in accordance with claim 13, wherein the reflection-fraction is less than the fraction-threshold when a surface of the object is chrome.

19. The method in accordance with claim 13, wherein the detection-characteristic includes a detector-gain of the lidar, and the detector-gain is increased when the reflection-fraction is less than the fraction-threshold.

20. The method in accordance with claim 13, wherein the detection-characteristic includes a detection-threshold of the lidar, and the detection-threshold is decreased when the reflection-fraction is less than the fraction-threshold.

21. The method in accordance with claim 13, wherein the reflection-fraction is determined using a strength of the reflected light-energy detected in the image.

22. The method in accordance with claim 13, wherein the fraction threshold is adjusted according to environmental conditions.

23. The method in accordance with claim 13, wherein adjusting the detection-characteristic of the lidar includes increasing a detector-gain or a detector-threshold of the lidar to better detect a distance or direction to the object.

24. The method in accordance with claim 13, wherein adjusting the detection-characteristic of the lidar includes adjusting a portion of a field-of-view of the lidar that corresponds to a bounding-box that is placed around the object by an object-detector.

\* \* \* \* \*

UNITED STATES PATENT AND TRADEMARK OFFICE
CERTIFICATE OF CORRECTION

PATENT NO. : 10,630,913 B2
APPLICATION NO. : 15/499076
DATED : April 21, 2020
INVENTOR(S) : Junqing Wei, Junsung Kim and Jong Ho Lee It is certified that error appears in the above-identified patent and that said Letters Patent is hereby corrected as shown below:

In the Claims

Column 6, Line 7, Claim 10, delete "fraction threshold" and insert -- fraction-threshold --;

Column 6, Line 60, Claim 22, delete "fraction threshold" and insert -- fraction-threshold --.

Signed and Sealed this
Fourth Day of August, 2020

Andrei Iancu
*Director of the United States Patent and Trademark Office*